(12) United States Patent
Hausberger et al.

(10) Patent No.: US 9,231,233 B2
(45) Date of Patent: Jan. 5, 2016

(54) BATTERY CONTROL DEVICE

(71) Applicant: SAMSUNG SDI CO., LTD., Yongin-si, Gyeonggi-do (KR)

(72) Inventors: Ingo Hausberger, St. Andrä (AT); Roland Klobasa, Graz (AT); Markus Lettner, Wettmannstätten (AT); Martin Trsek, Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 216 days.

(21) Appl. No.: 13/775,306

(22) Filed: Feb. 25, 2013

(65) Prior Publication Data

US 2013/0224534 A1 Aug. 29, 2013

(30) Foreign Application Priority Data

Feb. 24, 2012 (EP) ..................... 12156846

(51) Int. Cl.
*H02J 7/00* (2006.01)
*H01M 2/00* (2006.01)
*B60L 11/18* (2006.01)

(52) U.S. Cl.
CPC ............ *H01M 2/00* (2013.01); *B60L 11/1861* (2013.01); *B60L 2240/545* (2013.01); *B60L 2240/547* (2013.01); *B60L 2240/549* (2013.01); *Y02T 10/7005* (2013.01); *Y02T 10/705* (2013.01); *Y02T 10/7044* (2013.01); *Y02T 90/16* (2013.01)

(58) Field of Classification Search
CPC ...................................................... H02J 7/0004
USPC .................................. 320/107–109
See application file for complete search history.

(56) References Cited

U.S. PATENT DOCUMENTS 4,232,259 A * 11/1980 Kaieda et al. .................. 318/615
5,323,072 A * 6/1994 Fisch et al. ..................... 327/310
5,532,656 A * 7/1996 Yoshimura ..................... 333/185
5,850,351 A 12/1998 Lotfy et al.
6,230,105 B1 * 5/2001 Harris et al. .................... 702/57

(Continued)

FOREIGN PATENT DOCUMENTS

CN 101860053 A 10/2010
DE 10 2010 016 175 A1 8/2011

OTHER PUBLICATIONS

Wang Fei, Anti-Interference Technology of the Communication Cables, Electronics & Electrics, May 15, 2009, pp. 33-35, No. 5, China Academic Journal Electronic Publishing House, Beijing, China.

(Continued)

*Primary Examiner* — Paul Dinh
(74) *Attorney, Agent, or Firm* — Christie, Parker & Hale, LLP

(57) ABSTRACT

A battery control device having a battery system having a plurality of cells, a first electronic unit, a second electronic unit having a ground potential operatively connected to a potential of the battery system, a communication link including an electric isolation and a communication line having an electromagnetic shielding at least in sections, the communication link being configured to operatively connect and enable communication between the first electronic unit and the second electronic unit. The electromagnetic shielding is operatively connected to the ground potential of the second electronic unit.

20 Claims, 5 Drawing Sheets

(56) References Cited

U.S. PATENT DOCUMENTS

| | | | |
|---|---|---|---|
| 6,346,865 B1* | 2/2002 | Callewaert et al. | 333/185 |
| 6,449,166 B1* | 9/2002 | Sly et al. | 361/760 |
| 6,640,273 B1* | 10/2003 | Spisak et al. | 710/104 |
| 6,719,591 B1* | 4/2004 | Chang | 439/638 |
| 8,089,248 B2 | 1/2012 | Tabatowski-Bush | |
| 2001/0024521 A1* | 9/2001 | Anderson | 382/218 |
| 2004/0246751 A1* | 12/2004 | Honda | 363/39 |
| 2005/0242775 A1 | 11/2005 | Miyazaki et al. | |
| 2006/0212838 A1* | 9/2006 | Carson et al. | 716/17 |
| 2007/0115248 A1* | 5/2007 | Roberts et al. | 345/102 |
| 2007/0182377 A1 | 8/2007 | Vandensande | |
| 2007/0271044 A1* | 11/2007 | Gutierrez et al. | 702/45 |
| 2010/0058276 A1* | 3/2010 | Felder et al. | 716/17 |
| 2010/0173180 A1 | 7/2010 | Li | |
| 2011/0208461 A1* | 8/2011 | Chao et al. | 702/104 |
| 2011/0320853 A1* | 12/2011 | Maruko | 713/500 |
| 2012/0295555 A1* | 11/2012 | Greene et al. | 455/77 |
| 2013/0135021 A1* | 5/2013 | Moore et al. | 327/167 |

OTHER PUBLICATIONS

Chinese Patent Application No. 2013100560780 First Office Action, Sep. 1, 2014, p. 1, The Patent Office of the People's Republic of China, Beijing, China.

Zhou Ling, Chinese Patent Application No. 2013100560780 Search Report, Aug. 19, 2014, pp. 9-10, Electricity Invention Examinaion Department, Guangdong Patent Examination Cooperation Center, China. (English Abstract Submitted).

SIPO Office action dated Sep. 6, 2015, with English translation, for corresponding Chinese Patent application 201310056078.0, (9 pages).

* cited by examiner

BATTERY CONTROL DEVICE

CROSS-REFERENCE TO RELATED APPLICATIONS

The present application claims priority 35 U.S.C. §119 to European Patent Application No. 12 156 846.3 (filed on Feb. 24, 2012), which is hereby incorporated by reference in its entirety.

TECHNICAL FIELD

Embodiments relate to a battery control device having a battery system including a plurality of cells, a first electronic unit and a second electronic unit, in which particularly the ground potential of the second electronic unit is connected to a potential of the battery system and in which the first electronic unit and the second electronic unit are connected via a communication link for exchanging information.

BACKGROUND

Battery control devices are used, for example, for electric and hybrid vehicles in order to be able to monitor and control high-voltage battery systems which usually comprise a multiplicity of battery cells. For this purpose, a central first electronic unit may be constructed as battery management unit (BMU) which particularly monitors the overall status of the battery system and controls, for example, a charge balance between the battery cells. In addition, local cell supervisory controllers (CSC) are frequently used as second electronic units which, for example, detect states such as cell voltage and temperature for each individual battery cell or for groups of battery cells and communicate these to the battery management unit. The ground potentials of the cell supervisory controllers may be connected to the battery system in this case. The communication link between the battery management unit and the cell supervisory controllers is usually constructed as Controller Area Network (CAN) bus link since this type of link ensures reliable communication also for relatively long communication paths. However, the use of a CAN bus requires complex transmitting/receiving devices for implementing the protocol both in the battery management unit and the cell supervisory controllers.

As a communication link between electronic units, the Serial Peripheral Interface (SPI) bus is also known which may be implemented with less expenditure but is not very suitable for connecting electronic units which are farther apart spatially since an SPI bus link is susceptible to interference signals such as common-mode interference, in particular.

A battery monitoring and control device is known from DE 10 2010 016 175 A1, wherein a primary and a secondary connecting link are provided between a system controller and a battery monitoring module. The primary connecting link may be formed by an SPI connecting link. In the case of a failure or reduction of the serial link, the secondary connecting link, which is constructed as a UART (Universal Asynchronous Receiver/Transmitter) connecting link, handles the communication task.

From U.S. Patent Publication No. 2010/173180 A1, a battery management system is known having a battery which comprises a number of cells and having a number of devices for detecting the statuses of the cells which are coupled to the battery and having a control unit which is connected to a first one of the devices. The control unit may communicate with a destination device via a standard path and via a substitute path.

A battery management device is also known from U.S. Pat. No. 5,850,351 A, in which a number of batteries is monitored by a number of battery monitoring modules, one battery monitoring module being allocated to each battery.

From U.S. Patent Publication No. 2007/182377 A1, finally, a monitoring system is known for monitoring the voltage of a number of batteries, each battery comprising a number of cells. To each battery, a monitoring unit is allocated. In this arrangement, a first and a second monitoring unit measure the same cell of a battery. The monitoring units are arranged in a chain, adjacent monitoring units being connected via communication interfaces.

SUMMARY

In accordance with embodiments, a battery control device having an enhanced design which is configured to provide for a reliable and cost-effective link between a first electronic unit and a second electronic unit of the battery control device even in the case of relatively long communication paths.

In accordance with embodiments, a battery control device has a battery system having a plurality of cells, a first electronic unit and a second electronic unit, in which the ground potential of the second electronic unit is connected to a potential of the battery system, the first electronic unit and the second electronic unit are operatively connected via a communication link to exchanging information, the communication link has an electric isolation, the communication link comprises a communication line, the communication line has an electromagnetic shielding at least in sections, and the electromagnetic shielding is operatively connected to the ground potential of the second electronic unit.

In accordance with embodiments, a battery control device has a battery system having a plurality of cells; a first electronic unit; a second electronic unit having a ground potential operatively connected to a potential of the battery system; a communication link including an electric isolation and a communication line having an electromagnetic shielding at least in sections, the communication link being configured to operatively connect and enable communication between the first electronic unit and the second electronic unit, wherein the electromagnetic shielding is operatively connected to the ground potential of the second electronic unit.

In accordance with embodiments, a battery control device has a battery system having a plurality of cells; a first electronic unit; a plurality of second electronic units each configured for operative communication with one another and having a ground potential operatively connected to a potential of the battery system; a communication link including an electric isolation and a communication line having an electromagnetic shielding at least in sections, the communication link being configured to operatively connect and enable communication between the first electronic unit and some of the second electronic units, wherein the electromagnetic shielding is operatively connected to the ground potential of the second electronic unit.

In accordance with embodiments, a battery control device has a battery system having a plurality of cells; a first electronic unit; a plurality of second electronic units each configured for operative communication with one another and having a ground potential operatively connected to a potential of the battery system; a communication link including an electric isolation and a communication line having an electromagnetic shielding at least in sections, the communication link being configured to operatively connect and enable direct communication between the first electronic unit and at least two of the second electronic units, wherein the electromagnetic shielding is operatively connected to the ground potential of the second electronic unit.

In accordance with embodiments, a communication line which is constructed in an electromagnetically shielded manner is provided between the first electronic unit and the second electronic unit and additionally an electric isolation between the electronic units. The electromagnetic shielding is configured in such a manner that the electric shielding of the communication line is connected to the ground potential of the second electronic unit which itself is operatively connected again to a potential of the battery system. Electric shieldings are usually operatively connected to the largest locally available electrically conductive mass which would be, for example, the chassis of the vehicle in an arrangement in a vehicle. In accordance with embodiments, linking the shielding to the electrically isolated potential of the second electronic unit, that is to say, for example, a cell supervisory controller, leads both to a distinctly enhanced shielding of the communication line due to lower voltage differences between communication line and shielding and to lesser disturbances from the communication line to the vehicle. As a result, it is possible to ensure undisturbed communication between the electronic units via, for example, an SPI bus link even over relatively long connecting paths.

The electromagnetic shielding is advantageously operatively connected at both ends to the ground potential of the second electronic unit.

In accordance with embodiments, the first electronic unit is a first controller and the second electronic unit is a second controller.

In accordance with embodiments, the first electronic unit is a battery management unit (BMU). The battery management unit is configured as a higher-level control and management system to monitor and control the battery cells in their respective totality, that is to say, the entire battery system.

In accordance with embodiments, the second electronic unit is configured as a cell supervisory controller (CSC), such as a cell voltage monitoring unit. The cell supervisory controller is configured to monitor and/or control a battery unit, such as a single battery cell and/or a group of battery cells. The CSC is configured to communicate with a higher-level battery management unit.

In accordance with embodiments, the battery system may be configured as a high-voltage battery system of a vehicle which is configured to drive the vehicle.

In accordance with embodiments, the second electronic unit is configured to be supplied with power via the battery system. The first electronic unit may be fed, for example, from a 12-V on-board network of a vehicle.

In accordance with embodiments, the electric isolation is arranged between the first electronic unit and the communication line. The potential of the second electronic unit extends over the communication line into an area close or otherwise adjacent to the first electronic unit. On a module which comprises the first electronic unit, a separate area may be formed which accommodates components at the potential of the second electronic unit. The separate area is then electrically separate from other areas of the module and especially from the first electronic unit.

In accordance with embodiments, the electric isolation is configured as an optocoupler, inductive or capacitive transmission.

In accordance with embodiments, filter elements are arranged between the communication line and the first electronic unit and/or between the communication line and the second electronic unit. The filter elements are arranged on both sides of the communication line, above all in the case of bidirectional communication links. By way of suitable filter elements, voltage changes and current changes, above all, are attenuated in the communication line, and thus, disturbances of adjacent communication lines are reduced.

In accordance with embodiments, the filter elements may comprise series resistors and discharge capacitors which, in particular, are arranged on both sides of the shielding and which may form low-pass filters. The filter elements may also comprise inductors which are also arranged on both sides of the shielding, as a result of which common-mode interferences in the communication line are reduced.

In accordance with embodiments, information is exchanged via the communication link via a Serial Peripheral Interface (SPI) bus.

In accordance with embodiments, the communication line has a length of more than 10 cm, or more than 20 cm, or more than 50 cm. This is advantageous for providing for a spatially separate arrangement of the first electronic unit and the second electronic unit, but ensures a reliable communication link between the electronic units even over relatively great distances.

In accordance with embodiments, the battery control device comprises a plurality of second electronic units, such as a plurality of cell supervisory controllers, which are operatively connected to one another at least partially, in which at least one and/or not all of the second electronic units communicate directly with the first electronic unit. The second electronic units may be configured as so-called daisy chains in which only one or some of the second electronic units are connected to the, usually only, first electronic unit. The second electronic units are operatively connected to one another in a potential-isolated manner, for example, by way of capacitors in the connecting lines using a differential bus system.

In accordance with embodiments, if the battery control device comprises a plurality of second electronic units, at least two of the second electronic units configured to communicate directly with the first electronic unit, in which the direct communication links are configured as described above, that is to say, especially in each case electrically isolated, in each case shielded and/or in each case equipped with filters. The use of a plurality of second electronic units operatively connected directly to the first electronic unit is especially advantageous for ensuring a high data transmission rate overall between the first electronic unit and the second electronic units in spite of necessary interference reduction measures such as filters, and the associated low data transmission rate.

In accordance with embodiments, the ground potentials of the second electronic units are operatively connected to differently high potentials of the battery system so that the ground potentials of the second electronic units differ from one another. As a result, the shieldings of the various communication lines also have different ground potentials. By constructing the shieldings with in each case locally adapted ground potentials, optimum shielding against electromagnetic interference is achieved.

DRAWINGS

In the text which follows, embodiments will be described, by way of example, referring to the drawings, in which.

DESCRIPTION

Figure 1:
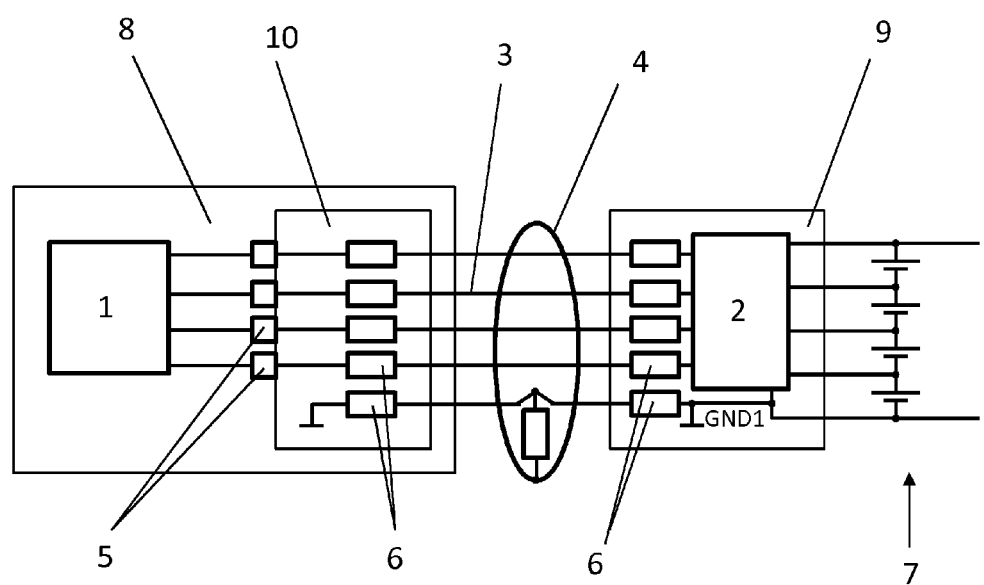
FIG. 1 illustrates a diagrammatic representation of a battery control device in accordance with embodiments.

FIG. 1 illustrates a battery control device in accordance with embodiments, having a first electronic unit 1 and a second electronic unit 2 which are operatively connected to one another via a communication link. The second electronic unit 2 is configured as a cell supervisory controller which monitors and/or controls one or more battery cells of a battery system 7. The first electronic unit 1 is configured as a battery management unit.

The communication link comprises a communication line 3 which is configured as an SPI bus link having a plurality of lines. In addition to the communication line 3 comprising a plurality of lines, the communication link may also comprise one or more control lines. Such control lines are configured, for example, as enable/disable lines to activate or deactivate, respectively, the electronic unit 2. Meaning, the idle current consumption of the electronic unit 2 may be reduced, for example. For the sake of clarity, such control lines are not illustrated.

Between the first electronic unit 1 and the communication line 3, an electric isolation 5 is arranged, the electric isolation 5 being configured, for example, as an optocoupler. The communication line 3 is protected from electromagnetic disturbances by a shielding 4. The shielding 4 is linked at both ends thereof to the ground potential GND1 of the second electronic unit 2. This ground potential GND1 is picked up by the second electronic unit 2 at the battery system 7 and extends via a ground line of the communication line 3 into a separate area 10 which is at the potential of the second electronic unit 2 and which is constructed in a module 8 which comprises the first electronic unit 1 and the electric isolation 5. Filter elements 6 are arranged both between the electric isolation 5 and the communication line 3 in the separate area 10 of the module 8, and on the module 9 which comprises the second electronic unit 2.

Figure 2:
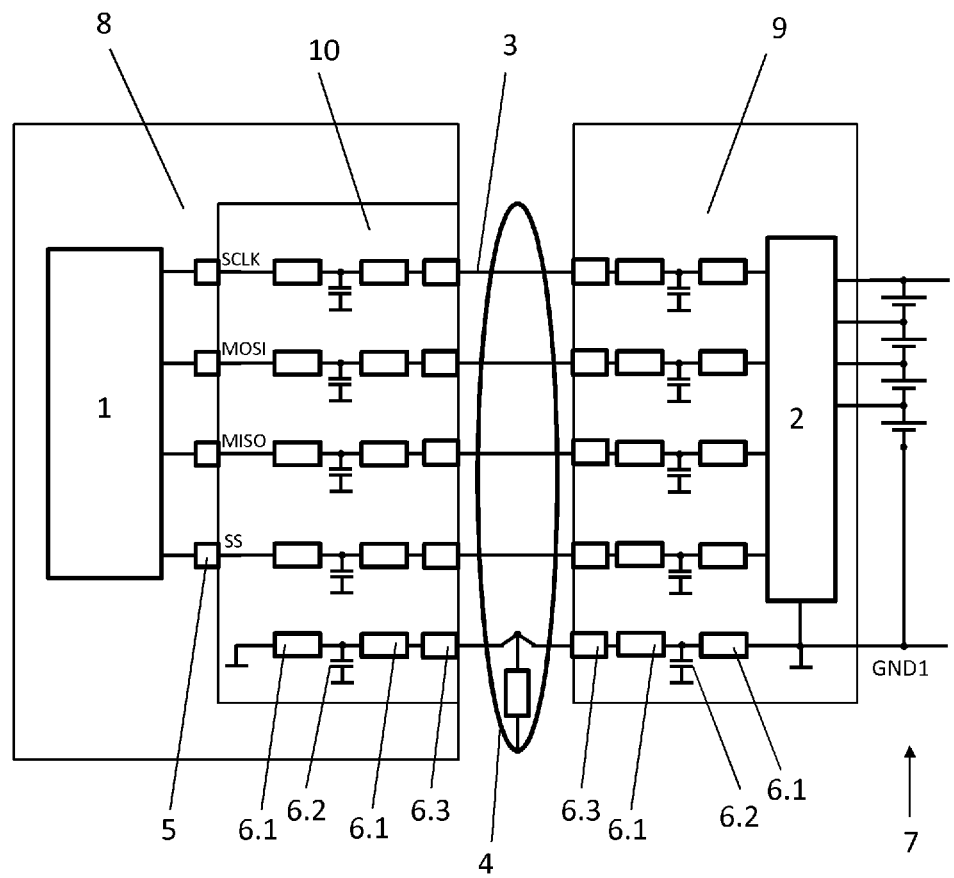
FIG. 2 illustrates a diagrammatic representation of to FIG. 1.

As illustrated in FIG. 2, the filter elements 6 comprise both ohmic resistors 6.1 and capacitors 6.2, for example, filter capacitors of the data lines to the ground potential GND1, and inductors 6.3, for example, ferrites, on both sides of the communication line 3.

Figure 3:
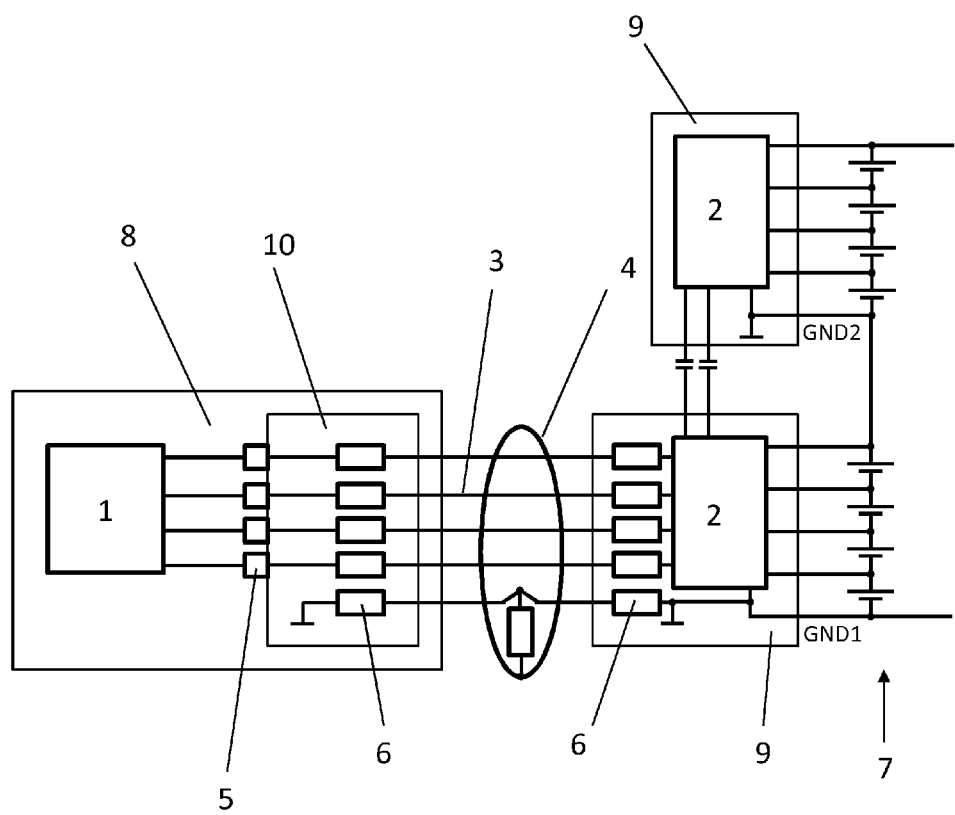
FIGS. 3 to 5 illustrate diagrammatic representations of battery control devices in accordance with embodiments.

As illustrated in FIG. 3, an additional second electronic unit 2, configured as a cell supervisory controller, may be operatively connected directly to a second electronic unit 2 in order to thus form a daisy chain. The communication of the further second electronic unit 2 with the first electronic unit 1 is carried out in accordance with embodiments indirectly via the communication link 3 of the second electronic unit 2 illustrated at the bottom in FIG. 3. The ground potentials GND1, GND2 of the two second electronic units 2 are linked to different potentials of the battery system.

Figure 4:
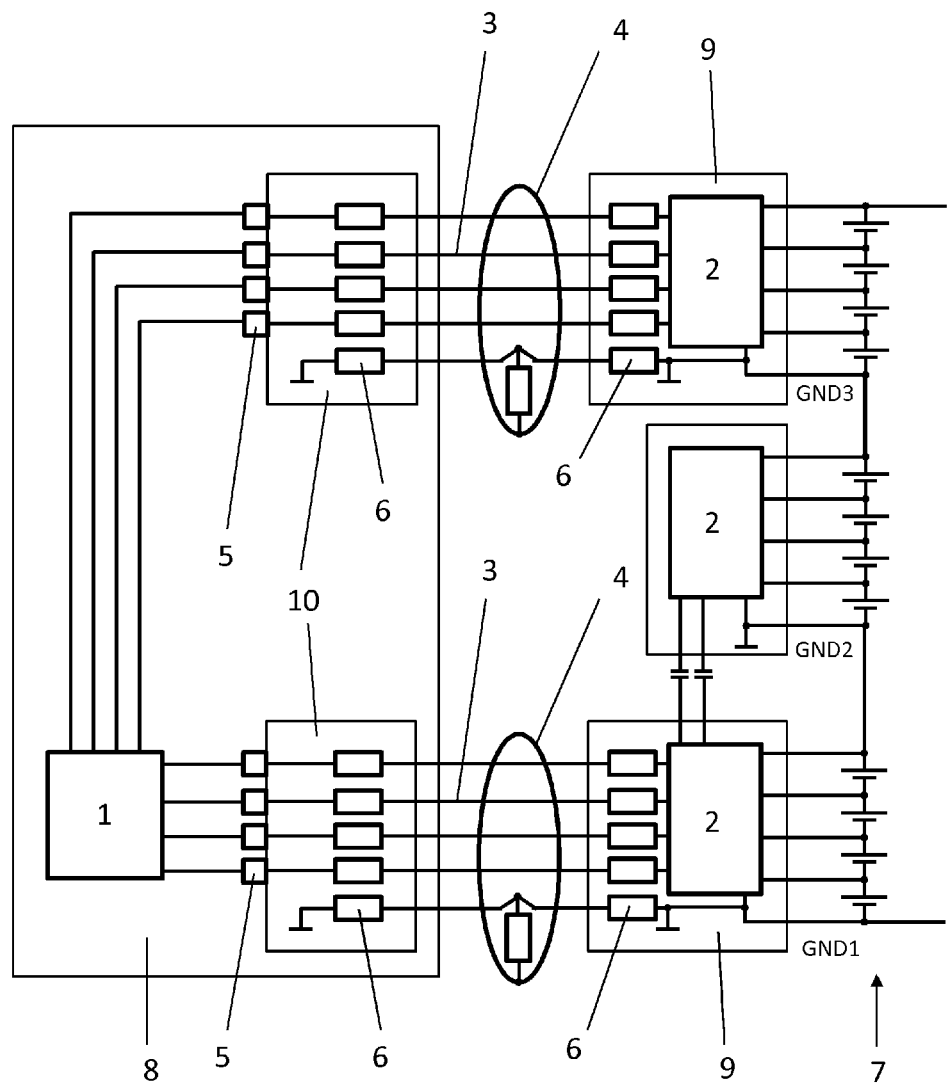
Figure 5:
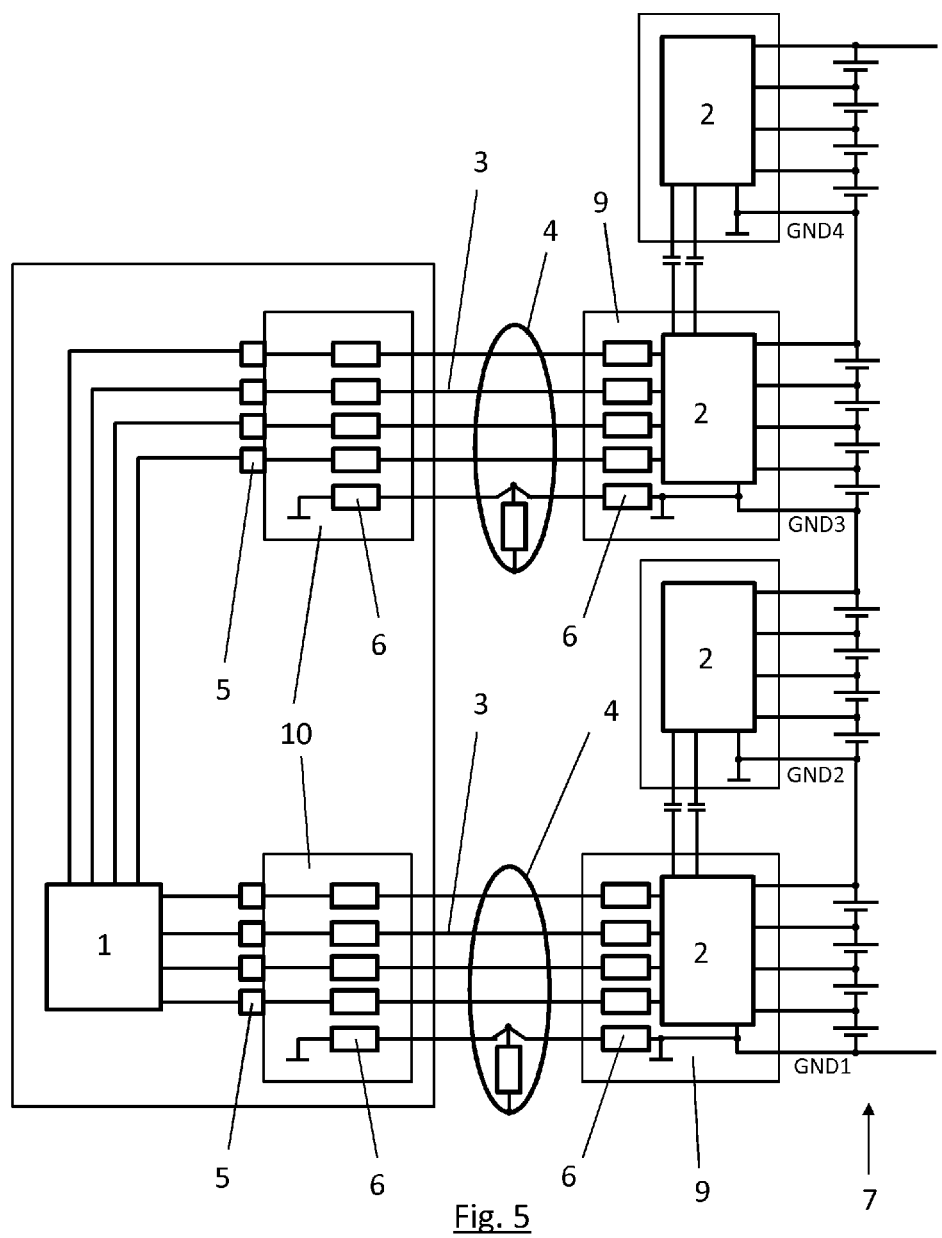

As illustrated in FIGS. 4 and 5, a plurality of second electronic units 2 may also be operatively connected to the battery management unit via in each case a separate direct communication line 3. In this arrangement, each communication line 3 is shielded electromagnetically via its own shielding 4, each shielding 4 being linked at both its ends to the respective ground potential GND1 or GND3, respectively, of its second electronic unit 2.

Embodiments advantageously enable a battery control device to be equipped with a reliable and cost-effective link between a first electronic unit and a second electronic unit even in the case of relatively long communication paths.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE SIGNS

1 First electronic unit
2 Second electronic unit
3 Communication line
4 Shielding
5 Electric isolation
6 Filter elements
6.1 Resistor
6.2 Capacitance
6.3 Inductor
7 Battery system
8 Module
9 Module
10 Separate area
GND1, GND2 Ground potential
GND3, GND4 Ground potential
SCLK, MOSI Lines of the SPI bus link
MISO, SS Lines of the SPI bus link

What is claimed is:

1. A battery control device comprising:
a battery system having a plurality of cells;
a first electronic unit;
a second electronic unit having a ground potential operatively connected to a potential of the battery system; and
a communication link including an electric isolation and a communication line having an electromagnetic shielding at least in sections, the communication link being configured to operatively connect and enable communication between the first electronic unit and the second electronic unit,
wherein the electromagnetic shielding is operatively connected to the ground potential of the second electronic unit.

2. The battery control device of claim 1, wherein the first electronic unit comprises a battery management unit.

3. The battery control device of claim 1, wherein the second electronic unit comprises a cell supervisory controller.

4. The battery control device of claim 1, wherein the electric isolation is arranged between the first electronic unit and the communication line.

5. The battery control device of claim 1, wherein the electric isolation comprises an optocoupler or inductive or capacitive transmission.

6. The battery control device of claim 1, wherein the electric isolation comprises an inductive transmission.

7. The battery control device of claim 1, wherein the electric isolation comprises a capacitive transmission.

8. The battery control device of claim 1, wherein the ground potential of the second electronic unit is configured to extend over the communication line into a separate area formed on a module.

9. The battery control device of claim 8, wherein the module comprises the first electronic unit and the separate area accommodates components with the ground potential of the second electronic unit.

10. The battery control device of claim 1, further comprising filter elements arranged between the communication line and the first electronic unit.

11. The battery control device of claim 1, further comprising filter elements arranged between the communication line and the second electronic unit.

12. The battery control device of claim 1, further comprising filter elements arranged between the communication line and the first electronic unit and between the communication line and the second electronic unit.

13. The battery control device of claim 12, wherein the filter elements comprise series resistors on both sides of the shielding, and discharge capacitors on both sides of the shielding.

14. The battery control device of claim 12, wherein the filter elements comprise inductors on both sides of the shielding.

15. The battery control device of claim 1, wherein an exchange of information via the communication link is carried out via a Serial Peripheral Interface bus.

16. The battery control device of claim 1, wherein the communication line has a length greater than 50 cm.

17. A battery control device comprising:
a battery system having a plurality of cells;
a first electronic unit;
a plurality of second electronic units each configured for operative communication with one another and having a ground potential operatively connected to a potential of the battery system; and
electromagnetic shielding at least in sections, a communication link being configured to operatively connect and enable communication between the first electronic unit and some of the second electronic units,
wherein the electromagnetic shielding is operatively connected to the ground potential of the second electronic unit.

18. The battery control device of claim 17, wherein a respective ground potential of each of the second electronic units is operatively connected to a different potential of the battery system.

19. A battery control device comprising:
a battery system having a plurality of cells;
a first electronic unit;
a plurality of second electronic units each configured for operative communication with one another and having a ground potential operatively connected to a potential of the battery system; and
a communication link including an electric isolation and a communication line having an electromagnetic shielding at least in sections, the communication link being configured to operatively connect and enable direct communication between the first electronic unit and at least two of the second electronic units,
wherein the electromagnetic shielding is operatively connected to the ground potential of the second electronic unit.

20. The battery control device of claim 19, wherein a respective ground potential of each of the second electronic units is operatively connected to a different potential of the battery system.

* * * * *